United States Patent
Afeiche et al.

(10) Patent No.: US 6,381,969 B1
(45) Date of Patent: May 7, 2002

(54) ECS WITH 2-STAGE WATER SEPARATION

(75) Inventors: George Afeiche, Los Angeles; Kathrine J. Clarke, Hermosa Beach; Roger Murry, San Pedro; Michel A. Jonqueres, Torrance, all of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/466,329

(22) Filed: Dec. 17, 1999

(51) Int. Cl.⁷ .................................................. F25B 9/00
(52) U.S. Cl. .......................................................... 62/87
(58) Field of Search ............................. 62/402, 401, 87, 62/88

(56) References Cited

U.S. PATENT DOCUMENTS

| | | |
|---|---|---|
| 2,184,354 A | 12/1939 | Levine |
| 2,214,368 A | 10/1940 | Greensfelder et al. |
| 2,829,505 A | 4/1958 | Oates |
| 3,091,097 A | 5/1963 | Friant |
| 4,127,011 A | 11/1978 | Giles et al. |
| 4,198,830 A | 4/1980 | Campbell |
| 4,209,993 A | 7/1980 | Rannenberg |
| RE32,100 E | 4/1986 | Rannenberg |
| 4,665,715 A | 5/1987 | Signoret |
| 4,963,174 A | 10/1990 | Payne |
| 5,086,622 A | 2/1992 | Warner |
| 5,154,065 A | 10/1992 | Herman |
| 5,323,624 A | 6/1994 | Schwalm |
| 5,327,744 A | 7/1994 | Frawley et al. |
| 5,461,882 A | 10/1995 | Zywiak |
| 5,887,445 A | 3/1999 | Murry et al. |
| 6,070,418 A | 6/2000 | Crabtree et al. |

FOREIGN PATENT DOCUMENTS

| | | |
|---|---|---|
| WO | WO 99/02399 | 1/1999 |
| WO | WO 99/51492 | 10/1999 |

*Primary Examiner*—Henry Bennett
*Assistant Examiner*—Malik N. Drake
(74) *Attorney, Agent, or Firm*—William J. Zak, Jr. Esq.

(57) ABSTRACT

A two spool environmental control system includes a low pressure spool subsystem comprising a low pressure turbine and a condenser downstream of the low pressure turbine. A high pressure spool subsystem is in air flow communication with the low pressure spool subsystem and includes the condenser, a first water extractor in air communication with the condenser, a high pressure turbine downstream of the condenser, a second water extractor in air flow communication with the condenser, and a reheater downstream of the high pressure turbine.

55 Claims, 1 Drawing Sheet

ECS WITH 2-STAGE WATER SEPARATION

BACKGROUND OF THE INVENTION

The present invention generally relates to air cycle environmental control systems (ECSs). More specifically, the invention relates to an improved two spool ECS and improved method of conditioning water vapor bearing compressed air by utilizing two stages of water condensation/separation with no heat of condensation being absorbed in the air path downstream of a first turbine outlet and upstream of a second turbine inlet in two spool subsytems.

ECSs are used to provide a supply of conditioned air to an enclosure, such as an aircraft cabin and cockpit. In the past, an air cycle ECS has typically operated on a flow of bleed air taken from an intermediate or a high pressure stage within a jet engine having multi-compression stages. The bleed air has usually been pre-cooled within a primary heat exchanger with heat being dumped to RAM air and then flowed to a compressor. After compression, the air has been routed through a series of heat exchangers and condensers.. Then, the air has typically been expanded by a turbine which is mechanically engaged to the compressor. Finally, the air can be sent to the cabin.

Past air cycle ECS designs have included 2, 3 and 4 wheel air cycle machines, with high pressure water separation cycles. The general distinction among the three designs relates to the number of so-called wheels that are mechanically engaged to one another. All three of the ECS designs typically utilize a reheater and a condenser heat exchanger to respectively pre-cool the bleed air and then condense the water vapor in it. After condensation, the condensed water is removed by a water extractor. The resulting dehumidified air flows to the reheater where the remaining water droplets are evaporated, leaving the residual moisture in the vapor phase. The dry air then flows to a turbine for expansion and consequent cooling. The expansion will typically cool the air to below freezing temperature and thus the vapor particles form ice nuclei and crystallize into snow, which are swept downstream. The expanded air from the turbine can then be used to cool and condense water in the condenser heat exchanger.

For the 2 and 3 wheel system, the expanded air which has been warmed in the condenser can then be directly supplied to a cabin. However, the differentiating feature between those two systems is that the 2 wheel typically has the turbine engaged to a compressor, while the 3 wheel has the turbine engaged to the compressor as well as a fan that pulls RAM air through the system. In the 4 wheel design, shown for example in U.S. Pat. No. 5,086,622, the expanded air which has been warmed in the condenser is then further expanded by another turbine for eventual supply to the cabin. That design has the two turbines engaged to the compressor and fan, i.e., 4 wheels. Also, the design in U.S. Pat. No. 5,086,622 does not flow the dehumidified air through a reheater prior to entering the first turbine. That presents a disadvantage since the residual condensed water droplets in the first turbine inlet stream impinge on the cold turbine blades and outlet walls and freeze out if the metal temperatures are much below freezing. Ice then quickly accumulates and must be rapidly melted to avoid clogging the cycle. Another disadvantage is having the condenser upstream of the second turbine, which leads to the need for a condenser of large volume and heavy weight.

In a fashion somewhat similar to U.S. Pat. Nos. 5,086,622, 5,461,882 discloses a 4 wheel system that flows compressed bleed air from a compressor, to a reheater, and then to a condenser. Thus, water is being extracted at high pressure, similar to U.S. Pat. No. 5,086,622. From the condenser, dehumidified air is expanded in a second turbine where heat of condensation is recovered, and then flowed into a cabin. Alternatively, the dehumidified air from the condenser flows back through the reheater, to a first turbine, and back to the condenser. Disadvantages, however, include the fact that the condenser is again located upstream of the second turbine, which leads to the need for a condenser of relatively large volume and heavy weight.

A common disadvantage to the 3 and 4 wheel air cycle machine systems is that they create an "off-design" limitation. In particular, the fan is forced to operate at the same speed as the compressor and turbine(s), even though the fan typically finds optimal performance at a speed lower than the compressor and turbine(s). Thus, there must be a compromise in design optimization, which has usually been balanced in favor of the compressor and turbine(s). The 2 wheel system shown in U.S. Pat. No. 4,198,830 partially ameliorates the "off-design" limitation by incorporating a 2 spool design. In other words, the fan is engaged to a turbine by one spool and another turbine is engaged to the compressor by another spool. The spools operate independently of one another by having bleed air separately routed to each spool. Accordingly, the spools can be said to be operating in "parallel" to one another. Thereby, the fan can operate at a speed independent of that of the compressor and its related turbine, which has often been about one-fourth the speed of the compressor/turbine.

Yet, having spools parallel to one another in the 2 wheel system creates energy inefficiencies. With the parallel design, the fan and its related turbine operate off the bleed air before it is compressed and conditioned. In contrast, the compressor and its related turbine(s) operate off the bleed air upon being compressed and conditioned. Thus, during auxiliary power unit operation, while a majority of the bleed air (perhaps about 87%) is subject to being conditioned, it is not all of the bleed air. The consequence is that, among other things, the cooling capacity is reduced. Also, if only a small portion of the bleed air (perhaps about 13%) is going to turn the fan, there is less fan power as compared to a situation where all of the bleed air is used. Less fan power translates into requiring larger RAM air heat exchangers. Another energy inefficiency in the prior 2 wheel system is that the heat of condensation and sensible cooling is lost to the supply air. That is due to the fact that the supply air typically comes directly from the condenser, with no downstream means of recovery. Furthermore, the past 2 wheel system has typically provided no means for utilizing the spool containing the fan as an alternative conditioning spool in the event of a failure by the other spool.

U.S. Pat. No. 5,887,445 also provides two spools, but the spools operate in series rather than in parallel. In a high pressure spool subsystem, compressed bleed air moves through a reheater, next a condenser, and then a water extractor. Accordingly, water is being condensed in the condenser and extracted at high pressure. From the water extractor, a dehumidified air moves back through the reheater, into a high pressure turbine, and back through the condenser. From the condenser, the air can flow into a low pressure spool system and, specifically, a low pressure turbine. Upon expansion of the air, the low pressure turbine can then direct the air to an enclosure to be cooled. While the invention provides advantages, factors such as lower space requirements and fault accommodation with the low pressure spool failed can still be improved upon.

As can be seen, there is a need for an improved two spool ECS and method of conditioning high pressure water vapor bearing air which effectively increases cooling capacity by decreasing the required size of heat exchangers. There is an additional need for such a system and method that increases efficiency by recovering the heat of condensation and sensible cooling that might otherwise be lost to the supply air, for example. A further need is a two spool ECS and method that provides flexibility in use, including the ability to still provide conditioned air when one of the two spools is nonoperational.

SUMMARY OF THE INVENTION

In one aspect of the present invention, a two spool environmental control system comprises a low pressure spool subsystem comprising a low pressure turbine and a condenser downstream of the low pressure turbine. A high pressure spool subsystem is in air flow communication with the low pressure spool subsystem and includes the condenser, a first water extractor in air communication with the condenser, a high pressure turbine downstream of the condenser, a second water extractor in air flow communication with the condenser, and a reheater downstream of the high pressure turbine.

In another aspect of the present invention, a method of conditioning water vapor bearing bleed air comprises using a high pressure spool subsystem including a condenser and a high pressure turbine; using a low pressure spool subsystem downstream of and in air flow communication with the high pressure spool subsystem, the air flow communication being in the absence of rotating engagement between the subsystems, and the low pressure subsystem including a low pressure turbine and the condenser; condensing substantially all of the water vapor in the condenser and high pressure turbine such that a condensed water vapor is produced; and extracting the condensed water vapor upstream and downstream of the high pressure turbine.

These and other features, aspects and advantages of the present invention will become better understood with reference to the following drawings, description and claims.

DETAILED DESCRIPTION OF THE INVENTION

Figure 1:
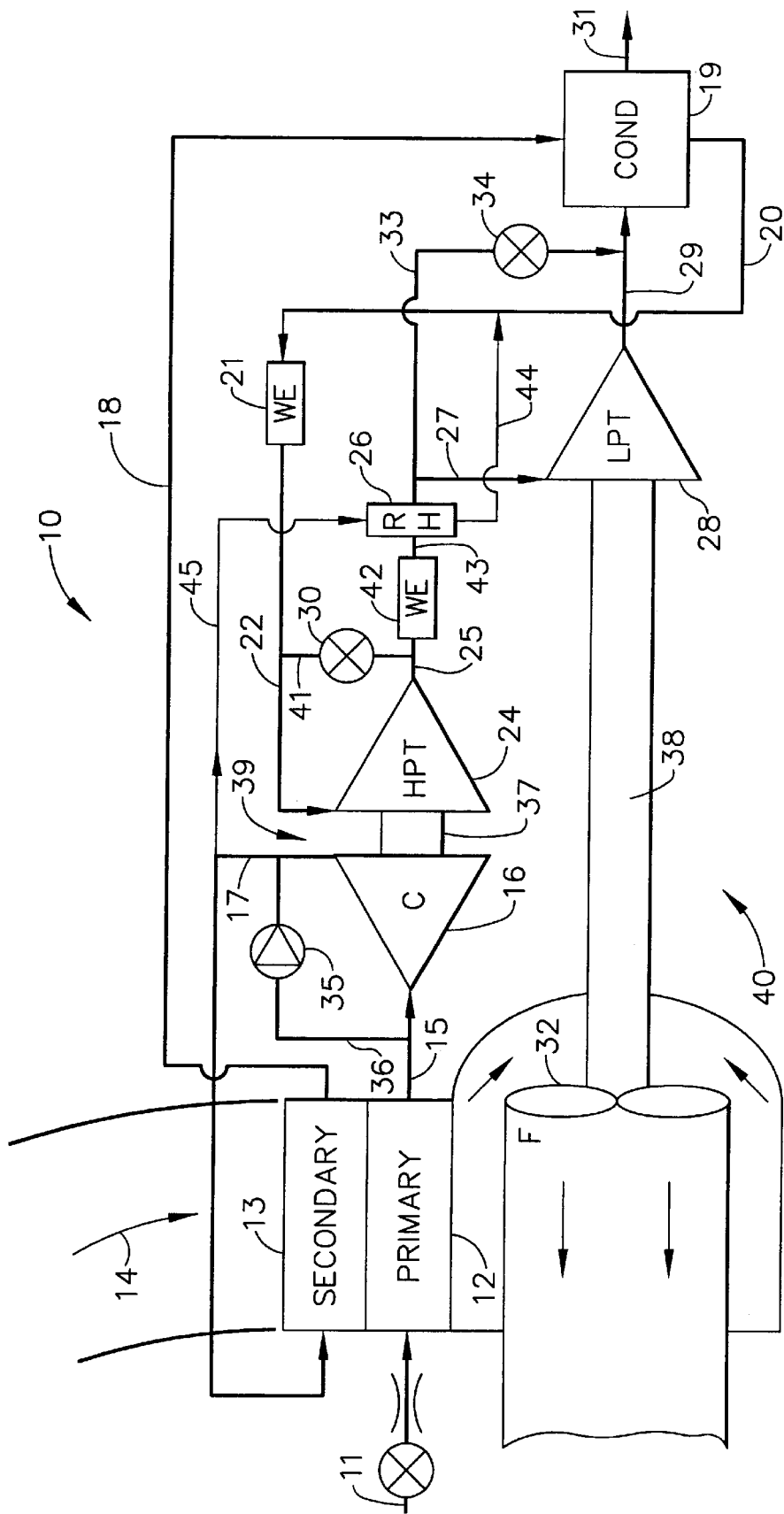
FIG. 1 is a schematic diagram of an environmental control system according to an embodiment of the present invention.

FIG. 1 schematically depicts an environmental control system (ECS) 10 according to one preferred embodiment of the present invention. The ECS 10 comprises a high pressure spool subsystem 39 which is in air flow communication with a low pressure spool subsystem 40. However, the subsystems 39, 40 are not mechanically engaged to one another, such as by a single spool or rotating shaft used in prior 3 and 4 wheel systems.

The high pressure spool subsystem 39 is primarily directed to conditioning high pressure water vapor bearing air for supply to, for example, an enclosure. The conditioning includes condensing substantially all water vapor prior to and/or in a high pressure turbine 24. The low pressure spool subsystem 40 is also involved in conditioning the air by providing a coolant medium to the high pressure spool subsystem 39, as well as driving a fan 32, for example, that moves ambient air which functions as a coolant medium in the overall system 10.

More specifically, the high pressure spool subsystem 39 includes a compressor 16, a secondary heat exchanger 13, a condenser 19, a first water extractor 21, and the high pressure turbine 24. The low pressure spool subsystem 40 includes a low pressure turbine 28, the condenser 19, and the fan 32. With the subsystems 39, 40 being in a series arrangement, as opposed to parallel one, the entirety of the water vapor bearing air to be conditioned can flow first through the high pressure spool subsystem 39 and then through the low pressure subsystem 40. Nevertheless, the present invention contemplates that a preferred embodiment can optionally allow a flow in parallel. Such a parallel flow means that the water vapor bearing air can flow through the low pressure spool subsystem 40 without first flowing through the high pressure spool subsystem 39.

In general, a water vapor bearing air 11 flows into the high pressure spool subsystem 39 while water vapor is condensed in a first stage by the condenser 19. Then, the condensed water vapor is extracted in a first stage by the first water extractor 21. The air flow is next expanded by the high pressure turbine 24 where a second stage of water vapor condensation can occur. The flow from the turbine 24 passes through a second water extractor 42 for a second stage of extraction. Among other things, the two stage water extraction both upstream and downstream of the turbine 24 is contrary to the teachings of past designs. From the second water extractor 42, the flow next moves into a reheater 26 and then into the low pressure spool subsystem 40. In the subsystem 40, the air is expanded by the low pressure turbine 28, passes through the condenser 19, and then exits as a supply or conditioned air 31.

In more particularly describing the present invention, and as shown in FIG. 1, if the selected environment for the present invention is an aircraft, the water vapor bearing air may be the bleed air 11 from a turbine engine of the aircraft. The bleed air 11 is sent to a primary heat exchanger 12 such that the bleed air 11 is cooled through a heat exchange relationship with RAM or ambient air 14. From the primary heat exchanger 12, a resulting pre-cooled air passes through a duct 15 and then either through the compressor 16 or around the compressor 16 and to the secondary heat exchanger 13. In the latter situation, the pre-cooled air moves from the duct 15, into a duct 36, through a check valve 35, and then into a duct 17 that is downstream of the compressor 16. This bypass alternative may occur, for example, during portions of the aircraft operating envelope, such as high altitude cruise, where the low engine bleed pressure combined with relatively cool RAM air temperature negate the cycle benefits of compressing the pre-cooled air.

On the other hand, if the pre-cooled air flows into the compressor 16, the air is compressed to a high pressure, such as about 67 to 77 psia. Although the amount of compression may vary depending upon the pressure of bleed air 11 entering the compressor (which may often be about 48 psia), it is contemplated that the compression ratio will typically be around 1.4 to 1.6 in the context of an aircraft. A compressed air exits the compressor 16 through the duct 17. From the duct 17, the compressed air moves to both the secondary heat exchanger 13 and (via a duct 45) the reheater 26. Because the compressed air is at high temperature, only a small amount, preferably not more than about 10%, of the compressed air flows to the reheater 26. Minimizing the amount of compressed air that flows to the reheater 26 minimizes the cycle performance penalty due to bypassing the secondary heat exchanger 13.

For the portion of the compressed air that flows into the secondary heat exchanger 13, further cooling of the compressed air occurs and additional condensation occurs, preferably about 60 to 75% of the total water content in the vapor of the bleed air 11. A compressed or high pressure, water vapor bearing air exits the secondary heat exchanger 13 and flows through a duct 18.

The condenser 19 receives the water vapor bearing air from the duct 18 and places such air in heat exchange relationship with a cold, substantially dehumidified air from the low pressure turbine 28, which is more fully described below. The cold air exiting the low pressure turbine 28 serves as the coolant medium in the heat exchange process and so absorbs the heat of condensation and heat of sensible cooling from the water vapor bearing air flowing through the condenser 19 from duct 18. By such heat exchange process, the water vapor bearing air is cooled to the point of water vapor condensation. For this embodiment, it is contemplated that not more than about 12% of the total water content in the water vapor of the bleed air 11 is condensed in the condenser 19. A cooled condensed water bearing air exits the condenser 19 through a duct 20 and flows into the first water extractor 21. Notwithstanding the foregoing, and depending upon the operating conditions and performance requirements of the ECS 10, the condenser 19 may be eliminated. In such instance, the water bearing air would exit the secondary heat exchanger 13 and pass directly to the first water extractor 21. Accordingly, all of the water would be condensed in the secondary heat exchanger 13 and the high pressure turbine 24.

The first water extractor 21, in this embodiment, preferably extracts about 90 to 95% of the condensed water from the cooled condensed water bearing air to provide a partially dehumidified air. It can be seen that since this water extraction occurs downstream of the compressor 16 and upstream of the high pressure turbine 24, the extraction is occurring at a high pressure. Optionally, the extracted water from the water extractor 21 can be flowed through a duct (not shown) to provide additional cooling of the RAM air 14 before the air 14 is drawn through the heat exchangers 12, 13. Whether or not the extracted water is used for further cooling of the RAM air 14, the partially dehumidified air passes through a duct 22 and then either into the high pressure turbine 24 or around the turbine 24 via a duct 41 and a low limit valve 30. The latter alternative may occur, for example, where the aircraft is operating at a portion of the flight envelope, such as high altitude cruise, where the engine bleed pressure is relatively low.

In the former alternative where the partially dehumidified air flows into the high pressure turbine 24 (which may be operating at about 70 to 75 psia for an aircraft at low altitude). The high pressure turbine 24 expands and cools the partially dehumidified air. In so doing, the high pressure turbine 24 condenses essentially all of the remaining water vapor in the partially dehumidified air. Preferably, about 20 to 25% of the total water content in the water vapor of the bleed air 11 is condensed in the high pressure turbine 24. As such, it can be understood that the system 10 condenses substantially all of the water vapor in the bleed air 11 prior to and/or at the high pressure turbine 24. Moreover, all of the water that is extracted from the bleed air 11 is condensed from vapor to liquid, prior to extraction, through heat exchange relationship with RAM air (i.e., in the secondary heat exchanger 13), heat exchange relationship with low pressure turbine exit air (i.e., in the condenser 19), and expansion cooling process (i.e., in the high pressure turbine 24). Importantly, a heat of condensation resulting from the water condensation in the high pressure turbine 24 can be recovered by the downstream low pressure turbine 28 through conversion to shaft power, as further described below.

Upon the high pressure turbine 24 expanding the partially dehumidified air, an intermediate or mid-pressure expanded air (typically about 40 psia) is produced which flows through a duct 25. In the duct 25, the mid-pressure expanded air can mix with the partially dehumidified air from the first water extractor 21 via the duct 41. The mixed air can then flow into a second water extractor 42. Therein, typically about 60 to 80% of the total water content can be removed. In comparison to the first stage of water separation, it can be seen that the second stage of water separation occurs downstream of the high pressure turbine 24 and, thus, occurs at a mid-pressure. In any event, from the second water extractor 42, the substantially dehumidified air mentioned above is produced. The term "substantially dehumidified" is intended to refer to air that is characterized by not more than about 20 to 30% relative humidity at cabin ambient temperature (i.e., typically about 20 to 24° C.) and sea level pressure (i.e., typically about 760 mm Hg).

When the substantially dehumidified air exits the second water extractor 42 via a duct 43, the air enters the reheater 26. Therein, the substantially dehumidified air is placed in heat exchange relationship with the water vapor bearing compressed air from the compressor 16, with the compressed air serving as a heat source. Because of the heat exchange relationship, the reheater 26 not only heats the substantially dehumidified air, but it also evaporates any remaining condensed water in the dehumidified air which ensures that ice will not form in the low pressure turbine 28 during the expansion cooling process. Also because of the heat exchange relationship, the compressed air from the duct 45 is cooled in the reheater 26. However, because the compressed air is at a high temperature upon entering the reheater 26, it is not cooled to/or below its dew point; therefore, no water is condensed in the reheater 26. Consequently, no heat of condensation is absorbed between the high pressure turbine 24 and the low pressure turbine 28 which is in contrast to past designs. The reheater 26 produces from the substantially dehumidified air a reheated air, while the compressed air provides a cooled compressed air (bearing water vapor but no condensed water). The cooled compressed air is returned (via a duct 44) to the duct 20 that is downstream of the condenser 19. In so doing, the cooled compressed air is re-included for use in the cycle.

The reheated air from the reheater 26 flows through a duct 27 and either into the low pressure spool subsystem 40 or into a duct 33, a temperature control valve 34, and a duct 29 that is downstream of the low pressure turbine 28. In the latter option, the same may occur to heat the flow into the condenser 19 that becomes the supply 31. In the former option where the reheated air flows into the low pressure subsystem 40, the reheated air first flows into the low pressure turbine 28. The temperature of the reheated air entering the low pressure turbine 28 has been raised by the heat of condensation that was released during the expansion cooling in the high pressure turbine 24. The low pressure turbine 28 converts the reheated air to shaft power, thereby recovering the heat of condensation from the high pressure turbine 24. In this embodiment of the invention wherein an expansion pressure ratio in the low pressure turbine 28 is preferably about 2.3, the amount of recovered heat of condensation is about 12% of the total heat available for recovery. The recovered heat can be used by the low pressure turbine 28, for example, to increase its rotating speed, boost its pressure ratio, and increase the expansion of the reheated air. Further, and as seen in FIG. 1, the low pressure turbine 28 is mechanically engaged to the fan 32 by means of a low pressure shaft 38. Thus, heat or energy absorbed by the low pressure turbine 28 can be converted to useful energy by the fan 32. With additional energy, the fan 32 can draw additional RAM air 14 through the primary and secondary heat exchangers 12, 13.

The low pressure turbine 28 produces a low pressure expanded air that flows through the duct 29 and into the condenser 19. In the condenser 19, the expanded air is placed in heat exchange relationship with the high pressure water vapor bearing air from the secondary heat exchanger 13. The expanded air is thereby warmed and then exits the condenser 19 as the supply or conditioned air 31.

It can be seen that the low pressure shaft 38 and its associated wheels (i.e., turbine 28 and fan 32) mechanically operate independently of a high pressure shaft 37 and its associated wheels (i.e., turbine 24 and compressor 16). Through such independent operation and the serial air flow arrangement of the subsystems 39, 40, the size of the heat exchangers 12, 13 can be smaller by about 10% when compared to past 3-wheel, single-spoof designs for the same cooling capacity. Additionally, with the condenser 19 upstream of the two turbines 24, 28, rather than between the two as in past designs, the size of the condenser 19 can be reduced in size by more than 50% in comparison to past condensers located between the two turbines. This is due to the greater temperature difference between the air streams on each side of the condenser. Locating the condenser 19 upstream of the two turbines 24, 28 also improves the fault tolerance of the system 10. The condensing of water vapor is maintained in the event the expansion cooling process, in either the high pressure turbine 24 or the low pressure turbine 28, is faulted due to a mechanical failure. Substantial water removal is maintained using the first water extractor 21. The reheater 26 can also be at least about 50% smaller when compared to those used in the prior art due to the low hot-side air flow rate (preferably less than about 10% of total cycle air) and the greater temperature difference between the air streams on each side of the reheater. Having a smaller overall size of the ECS 10 provides it with a larger potential for serving as a superior system for more applications.

For those skilled in the art, it can also be appreciated that the present invention provides efficiency by enabling the two spools of the system to operate independently of one another. By so doing, one spool can operate at its optimal parameters while the other spool can do so likewise. Additionally, because the present invention enables the spools to operate in series, the flow rate through the low pressure spool 40 is essentially 100% of the bleed air 11 that enters the ECS 10. Thus, the fan 32 power can increase over prior two-spool designs, where the spools operate in parallel, by about 300%. That increase translates into about 60% more flow through the heat exchangers 12, 13. Therefore, the heat exchangers can be sized smaller (about 22% by volume and weight).

It should be understood, of course, that the foregoing relates to preferred embodiments of the invention and that modifications may be made without departing from the spirit and scope of the invention as set forth in the following claims.

We claim:

1. A method for conditioning water vapor bearing compressed air for supply as conditioned air, comprising:
    using a high pressure spool subsystem including a high pressure turbine and a compressor;
    using a low pressure spool subsystem downstream of and in air flow communication with said high pressure spool subsystem, said air flow communication being in the absence of rotating engagement between said subsystems, and said low pressure subsystem including a low pressure turbine and condenser;
    said condenser being upstream of said low pressure turbine and said high pressure turbine; and
    condensing, for the purpose of dehumidification, substantially all of said water vapor upstream of and in said high pressure turbine.

2. The method of claim 1, further comprising precluding water vapor condensation downstream of said high pressure turbine.

3. A method for conditioning water vapor bearing compressed air for supply as conditioned air, comprising:
    using a high pressure spool subsystem including a high pressure turbine and a compressor;
    using a low pressure spool subsystem downstream of and in air flow communication with said high pressure spool subsystem, said air flow communication being in the absence of rotating engagement between said subsystems, and said low pressure subsystem including a low pressure turbine;
    condensing, for the purpose of dehumidification, substantially all of said water vapor upstream of and in said high pressure turbine; and
    precluding a recovery of heat of condensation between said high and low pressure turbines.

4. The method of claim 3, further comprising recovering heat of condensation in said low pressure turbine.

5. The method of claim 3, further comprising extracting condensed water vapor in two stages.

6. The method of claim 5, wherein one of said stages is upstream of said high pressure turbine and another of said stages is downstream of said high pressure turbine.

7. A method for conditioning water vapor bearing compressed air for supply as conditioned air, comprising:
    using a high pressure spool subsystem including a condenser and a high pressure turbine;
    using a low pressure spool subsystem downstream of and in air flow communication with said high pressure spool subsystem, said air flow communication being in the absence of rotating engagement between said subsystems, and said low pressure subsystem including a low pressure turbine and said condenser;
    condensing substantially all of said water vapor in said condenser and high pressure turbine such that a condensed water vapor is produced; and
    extracting said condensed water vapor upstream and downstream of said high pressure turbine.

8. The method of claim 7, wherein extracting said condensed water vapor occurs in a first water extractor disposed between said condenser and high pressure turbine.

9. The method of claim 7, wherein extracting said condensed water vapor occurs in a second water extractor disposed between said high and low pressure turbines.

10. The method of claim 7, further comprising reheating an expanded air from said high pressure turbine.

11. The method of claim 7, further comprising expanding in said low pressure turbine a reheated air from a reheater downstream of said high pressure turbine.

12. The method of claim 7, further comprising warming in said condenser an expanded air from said low pressure turbine.

13. The method of claim 7, further comprising flowing said water vapor bearing compressed air into a reheater downstream of said high pressure turbine such that said compressed air acts as a heat source in said reheater.

14. A two spool air cycle system for conditioning water vapor bearing compressed air, comprising:
- a low pressure spool subsystem comprising a low pressure turbine and a condenser; and
- a high pressure spool subsystem in air flow communication with said low pressure spool subsystem, said high pressure spool subsystem comprising said condenser, a first water extractor downstream of said condenser, a high pressure turbine downstream of said condenser, and a second water extractor downstream of said high pressure turbine.

15. The system of claim 14, wherein said low pressure spool subsystem further comprises a fan mechanically engaged to said low pressure turbine.

16. The system of claim 14, wherein said high pressure spool subsystem further comprises a reheater downstream of said high pressure turbine.

17. The system of claim 14, wherein said high pressure spool subsystem further comprises a compressor upstream of said condenser.

18. The system of claim 14, wherein said first water extractor extracts condensed water vapor at a high pressure.

19. The system of claim 14, wherein said second water extractor extracts condensed water vapor at a mid pressure.

20. The system of claim 14, wherein said low pressure turbine recovers heat of condensation.

21. A two spool air cycle system for conditioning water vapor bearing compressed air, comprising:
- a low pressure spool subsystem comprising a low pressure turbine and a condenser downstream of said low pressure turbine; and
- a high pressure spool subsystem in air flow communication with said low pressure spool subsystem, said high pressure spool subsystem comprising said condenser, a first water extractor in air communication with said condenser, a high pressure turbine downstream of said condenser, a second water extractor in air flow communication with said condenser, and a reheater downstream of said high pressure turbine.

22. The system of claim 21, wherein said high pressure spool subsystem further comprises a compressor upstream of said condenser.

23. The system of claim 21, wherein said first water extractor is disposed intermediate said condenser and high pressure turbine.

24. The system of claim 21, wherein said second water extractor is disposed intermediate said high pressure turbine and reheater.

25. The system of claim 21, wherein said reheater is upstream of said low pressure turbine.

26. The system of claim 21, wherein said reheater heats air in the substantial absence of water vapor condensation.

27. The system of claim 21, wherein said high pressure turbine produces a heat of condensation and said low pressure turbine absorbs said heat of condensation.

28. A two spool air cycle system for conditioning water vapor bearing compressed air, comprising:
- a compressor;
- a condenser downstream of said compressor;
- a first water extractor downstream of said condenser;
- a high pressure turbine downstream of said first water extractor;
- a second water extractor downstream of said high pressure turbine;
- a reheater downstream of said second water extractor; and
- a low pressure turbine downstream of said reheater,
- whereby said low pressure turbine absorbs a heat of condensation in the substantial absence of said heat of condensation being absorbed by said system at a position intermediate said high and low pressure turbines.

29. A method for conditioning water vapor bearing compressed air for supply as conditioned air, comprising:
- using a high pressure spool subsystem including a high pressure turbine and a compressor;
- using a low pressure spool subsystem downstream of and in air flow communication with said high pressure spool subsystem, said air flow communication being in the absence of rotating engagement between said subsystems, and said low pressure subsystem including a low pressure turbine; and
- extracting condensed water vapor upstream of and downstream of said high pressure turbine.

30. The method of claim 29, further comprising disposing a first water extractor intermediate said compressor and high pressure turbine.

31. The method of claim 29, further comprising disposing a second water extractor intermediate said high pressure turbine and low pressure turbine.

32. The method of claim 29, wherein extracting condensed water vapor upstream of said high pressure turbine occurs at a high pressure.

33. The method of claim 29, wherein extracting condensed water vapor downstream of said high pressure turbine occurs at a mid pressure.

34. The method of claim 29, further comprising condensing, for the purpose of dehumidification, substantially all of said water vapor upstream of and in said high pressure turbine.

35. A method for conditioning water vapor bearing compressed air for supply as conditioned air, comprising:
- using a high pressure spool subsystem including a high pressure turbine and a compressor;
- using a low pressure spool subsystem downstream of and in air flow communication with said high pressure spool subsystem, said air flow communication being in the absence of rotating engagement between said subsystems, and said low pressure subsystem including a low pressure turbine; and
- extracting condensed water vapor at a high pressure and a mid pressure.

36. The method of claim 35, wherein extracting condensed water vapor at said high pressure occurs between said compressor and high pressure turbine.

37. The method of claim 35, wherein extracting condensed water vapor at said mid pressure occurs between said high pressure turbine and low pressure turbine.

38. The method of claim 35, further comprising disposing a first water extractor intermediate said compressor and high pressure turbine.

39. The method of claim 35, further comprising disposing a second water extractor intermediate said high pressure turbine and low pressure turbine.

40. The method of claim 35, further comprising precluding water vapor condensation downstream of said high pressure turbine.

41. The method of claim 35, further comprising precluding a recovery of heat of condensation between said high and low pressure turbines.

42. A method for conditioning water vapor bearing compressed air for supply as conditioned air, comprising:
- extracting condensed water vapor from said compressed air at a high pressure;

expanding said compressed air in a high pressure turbine;

extracting condensed water vapor from said compressed air at a mid pressure; and expanding said compressed air in a low pressure turbine.

43. The method of claim 42, further comprising condensing said water vapor upstream of said high pressure turbine.

44. The method of claim 42, further comprising condensing said water vapor in said high pressure turbine.

45. The method of claim 42, further comprising reheating said compressed air in a reheater intermediate said high and low pressure turbines.

46. A two spool air cycle system for conditioning water vapor bearing compressed air, comprising:

a low pressure spool subsystem comprising a low pressure turbine; and a high pressure spool subsystem in air flow communication with said low pressure spool subsystem, said high pressure spool subsystem comprising a first water extractor, a high pressure turbine downstream of said first water extractor, and a second water extractor downstream of said high pressure turbine.

47. The system of claim 46, wherein said high pressure spool subsystem further comprises a condenser upstream of said high pressure turbine.

48. The system of claim 46, wherein said high pressure spool subsystem further comprises a condenser upstream of said high pressure turbine.

49. The system of claim 48, wherein said first water extractor is intermediate said condenser and high pressure turbine.

50. The system of claim 46, wherein said high pressure spool subsystem further comprises a reheater intermediate said high and low pressure turbines.

51. The system of claim 46, wherein said first water extractor extracts condensed water vapor at a high pressure.

52. The system of claim 46, wherein said second water extractor extracts condensed water vapor at a mid pressure.

53. An air cycle system for conditioning water vapor bearing compressed air, comprising:

a first water extractor;

a high pressure turbine downstream of said first water extractor;

a second water extractor downstream of said high pressure turbine; and a low pressure turbine downstream of said second water extractor.

54. The system of claim 53, further comprising a reheater intermediate said high and low pressure turbines.

55. The system of claim 53, further comprising a condenser in flow communication with said high pressure turbine.

* * * * *